(12) United States Patent
Xiong et al.

(10) Patent No.: US 12,306,034 B2
(45) Date of Patent: May 20, 2025

(54) DYNAMIC IDENTIFICATION METHOD OF BRIDGE SCOUR BASED ON HEALTH MONITORING DATA

(71) Applicant: SOUTHEAST UNIVERSITY, Jiangsu (CN)

(72) Inventors: Wen Xiong, Jiangsu (CN); Rongzhao Zhang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 223 days.

(21) Appl. No.: 17/798,685

(22) PCT Filed: Nov. 5, 2021

(86) PCT No.: PCT/CN2021/128853
§ 371 (c)(1),
(2) Date: Aug. 10, 2022

(87) PCT Pub. No.: WO2023/060672
PCT Pub. Date: Apr. 20, 2023

(65) Prior Publication Data
US 2023/0228618 A1 Jul. 20, 2023

(30) Foreign Application Priority Data
Oct. 15, 2021 (CN) .......................... 202111203755.8

(51) Int. Cl.
*G01H 17/00* (2006.01)
(52) U.S. Cl.
CPC .................. *G01H 17/00* (2013.01)
(58) Field of Classification Search
None
See application file for complete search history.

(56) References Cited

U.S. PATENT DOCUMENTS

2016/0266072 A1* 9/2016 Ochiai ................ G01H 1/00
2018/0224352 A1 8/2018 Zhang et al.
(Continued)

FOREIGN PATENT DOCUMENTS

CN 105241660 A 1/2016
CN 109002673 A 12/2018
(Continued)

OTHER PUBLICATIONS

Yi, Tinghua et al., The Research On Detection Methods of GPS Abormal Monitoring Data Based On Control Chart, Engineering Mechanics vol. 30, issue 8, Aug. 31, 2013, pp. 133-141.
(Continued)

*Primary Examiner* — Raul J Rios Russo
*Assistant Examiner* — Carl F. R. Tchatchouang
(74) *Attorney, Agent, or Firm* — MUNCY, GEISSLER, OLDS & LOWE, P.C.

(57) ABSTRACT

The present disclosure discloses a dynamic identification method of bridge scour based on health monitoring data, including: collecting an acceleration-time curve of a bridge foundation structure when vibrating: collecting the acceleration-time curve of each bridge foundation structure in a scour state by a health monitoring system when each bridge foundation structure vibrates; obtaining a warning control threshold of abnormal warning of a time-frequency change of a first-time scour bridge evaluation reference mode by calculation; identifying an abnormal segment in frequency segments of a scoured bridge to be identified; identifying an abnormal time-frequency sequence in the time-frequency abnormal segment: updating a warning control threshold of its own random fluctuation of time-frequency characteristics of a bridge scour reference mode after completing scour early warning of the abnormal sequence, so as to prepare for next anomaly identification and scour early warning. The (Continued)

present disclosure provides a method for dynamically identifying a foundation scour depth by performing dynamic characteristic analysis of a structural system, and the identification method can realize the technical features of long-term dynamic scour monitoring and early warning of underwater foundations.

7 Claims, 5 Drawing Sheets

(56) References Cited

U.S. PATENT DOCUMENTS

| | | |
|---|---|---|
| 2020/0300972 A1* | 9/2020 | Wang .................... A61B 5/0002 |
| 2020/0375480 A1 | 12/2020 | Costa et al. |
| 2021/0169417 A1* | 6/2021 | Burton ................. A61B 5/4857 |

FOREIGN PATENT DOCUMENTS

| | | | |
|---|---|---|---|
| CN | 112085354 A | 12/2020 | |
| CN | 109828033 B * | 8/2021 | |
| WO | WO-2018190216 A1 * | 10/2018 | ............. F03D 17/00 |

OTHER PUBLICATIONS

Xiong, Wen et al., Sour condition analysis on pylons of Hangzhou Bay Bridge by tracing dynamic behaviors of superstructures, Journal of Southeast University vol. 48, issue 5, Sep. 30, 2018, pp. 871-877.

* cited by examiner

DYNAMIC IDENTIFICATION METHOD OF BRIDGE SCOUR BASED ON HEALTH MONITORING DATA

TECHNICAL FIELD

The present disclosure relates to the technical field of bridge health monitoring, and particularly relates to a method for dynamically identifying a foundation scour depth by analyzing dynamic characteristics of a structural system based on time course data of bridge vibration acceleration monitoring.

BACKGROUND

At present, scour to a bridge foundation is one of the main factors for the failure of function and safety of the bridge structures. Taking the United States as an example, from 1966 to 2005, 58% of the broken bridges (1502 bridges) in the collapsed bridges throughout the nation were related to the scour to the bridge foundation structure. The U.S. Department of Transportation has regarded bridge foundation scour as one of the most common reasons for failure of function and safety of highway bridge structures. In China, especially for the expressway bridges over water in the eastern region, the pile length is generally within the design range of 10-50 m. According to the regular inspection data of aged and old bridge site diseases, it is found that the common scour depth of the bridge foundation is more than 5 m, and under certain hydrological conditions, the scour depth may even be more than 10 m. For large bridges spanning rivers, lakes and seas, the balance scour depth of the foundation structure can reach more than 20 m. In addition, because scour occurs below the water surface, the bridge foundation is damaged by scour usually without any symptoms, which seriously endangers the safety performance of the bridge structure and the smooth operation of the traffic road network.

In order to predict the development of the local scour form in advance, the safety assessment and reinforcement decision of the bridge foundation structure in the operation stage is reasonably carried out, which prevents the catastrophic collapse of the structure caused by the scour to the bridge foundation, it is obviously necessary to detect and diagnose the scour state of the bridge foundation regularly for a long time. For a long time, the scour state of the bridge foundation is mainly determined based on the subjective experience of daily inspection, resulting in poor accuracy. Although scour model experiments can be carried out for individual super-large bridges, it is difficult to determine the similarity ratio of the models, and the expenditure of manpower and material resources for experiments is high, so they cannot be widely used in general bridge design. In recent years, newly emerging underwater detection equipment, such as the sonar, the TDR technology, the multi-beam detection system, and the underwater robot, is also limited by terrain factors when detecting the foundation scour depth, and the cost of single-time detection is high, which cannot realize long-term dynamic underwater monitoring.

SUMMARY

In order to overcome the above-mentioned defects in the prior art, the present disclosure provides a method for dynamically identifying a foundation scour depth by analyzing dynamic characteristics of a structural system based on time course data of bridge vibration acceleration monitoring, which has the technical features of wide applicability, relatively low cost, and capability of realizing long-term dynamic scour monitoring and early warning of underwater foundations.

In order to solve the above technical problems, the technical solution adopted by the present disclosure is a dynamic identification method of bridge scour based on health monitoring data, including the following steps:

step 1: collecting an acceleration-time curve of a bridge foundation structure when vibrating: collecting the acceleration-time curve of each bridge foundation structure in a scour state by a health monitoring system when each bridge foundation structure vibrates, and performing anti-interference factor pre-treatment on the acceleration-time curve;

step 2: obtaining a frequency-time curve of a bridge scour reference mode: by Fourier transform on the acceleration-time curve in step 1, obtaining the frequency-time curve of the scour reference mode;

step 3: determining a value of a significance level value $\alpha$;

step 3.1: by using a kernel density estimation method, establishing a time-frequency probability distribution model of a bridge scour evaluation reference mode, and transforming a scour reference mode frequency into a random variable which obeys standard normal distribution;

step 3.2: according to the random variable which obeys the standard normal distribution, in combination with a Shewhart mean control chart, preliminarily setting the value of the significance level value $\alpha$, and obtaining a probability distribution function corresponding to the significance level value $\alpha$, and establishing a normal distribution probability model; and step 3.3: performing identification sensitivity calibration according to the range of the preliminarily set value of the significance level value $\alpha$;

step 4: bringing a into the normal distribution probability model, and obtaining an upper control threshold UCL and a lower control threshold LCL of the abnormal warning of a time-frequency change of a first-time scour bridge evaluation reference mode by calculation;

step 5: identifying an abnormal segment in frequency segments of a scoured bridge to be identified:

step 6: identifying an abnormal time-frequency sequence in the time-frequency abnormal segment:

step 6.1: the time-frequency abnormal segment including a plurality of time-frequency sequences, identifying time-frequency abnormal sequences in the plurality of time-frequency sequences:

setting identification parameters of the time-frequency abnormal sequence, the identification parameters of the time-frequency abnormal sequence comprising a time-duration ratio parameter $P_{L/U}'$ of an abnormal reference frequency sequence, a time interval parameter Ts' between two adjacent abnormal frequencies, and a change difference parameter $M_s'$ of a mean value of scour reference frequencies;

step 6.2: calculating the time-duration ratio parameter $P_{L/U}$ of the abnormal frequency sequence of the abnormal segment:

$$P_{L/U} = T_{ab}/T_{t0}$$

where, Tab is the time duration of the frequency sequence exceeding the upper control threshold UCL or the lower control threshold LCL, and $T_{t0}$ is the total time duration of the abnormal segment;

calculating Ts of the abnormal segment, Ts being a time interval between two adjacent Tabs;

When $P_{L/U} > P_{L/U}'$, and Ts<Ts', it is determined that the time-frequency sequence is the abnormal sequence, and step 6.3 is started, otherwise, it is determined that the time-frequency sequence is normal;

step 6.3: calculating a scour reference frequency time sequence mean value change difference $M_s$ in the time-frequency abnormal sequence:

$$M_s'|M_1 - M_2|$$

where $M_1$ is a frequency mean value of the time-frequency abnormal sequence, and $M_2$ is a frequency mean value of the normal segment in a healthy state of the previous of abnormal segment with the same time interval;

When $M_s \leq M_s'$, it is determined that the abnormal sequence is in normal signal oscillation; when $M_s > M_s'$, scour early warning is performed for the abnormal sequence; and step 7: after completing the scour early warning of the abnormal sequence, repeating steps 5-6 to update the upper control threshold and the lower control threshold of random fluctuation of time-frequency characteristics of the bridge scour reference mode so as to prepare for the next anomaly identification and scour early warning.

As a further preferred solution of the present disclosure, step 1 specifically includes the following steps:

step 1.1: after obtaining the acceleration-time curve of each bridge foundation in the scour state by the health monitoring system when each bridge foundation structure vibrates, removing a high-order frequency signal in the acceleration-time curve by using a filter and a signal detrending function;

step 1.2: calculating and processing to obtain a missing signal length in a frequency-time curve:

firstly, defining an index structure missing:

$$\text{Missing} = \begin{bmatrix} s_1 & e_1 \\ s_2 & e_2 \\ \dots & \dots \\ s_m & s_m \\ \dots & \dots \\ s_k & e_k \end{bmatrix}$$

where, $s_m$, $e_m$ are respectively beginning and ending indexes of missing data in the m segment; k is the total number of segments with missing data; a missing signal length in the m segment is missing. longm=$e_m - s_m$;

when the missing signal length is less than a length tolerance threshold, the missing signal length is filled by an extension filling method; and when the missing signal length is greater than the length tolerance threshold, discarding the missing signal length;

step 1.3: identifying and removing outliers in the frequency-time curve, and supplementing the removed outliers by using a numerical interpolation method; and step 1.4: removing the temperature effect in the acceleration-time curve obtained by the processing in step 1.3, and obtaining a frequency-time curve of the bridge scour reference mode; measuring a bridge foundation structure frequency of the bridge foundation structure at a specific temperature by a temperature sensor in advance, decomposing the acceleration-time curve by an EMD algorithm to obtain a multi-order sub-mode acceleration-time curve, obtaining a main frequency by Fourier transform of the multi-order sub-mode acceleration-time curve, and eliminating the acceleration-time curve which is close to the bridge foundation structure frequency at the specific temperature, and obtaining an acceleration-time curve of the scour reference mode after reconstruction.

As a further preferred solution of the present disclosure, step 3.1 specifically includes the following steps:

taking a frequency signal to be identified as a one-dimensional continuous sample vector $f_i$, and obtaining a kernel density estimation vector PDF ($f_i$) of the sample vector $f_i$ by using a selected kernel density function;

$$PDF(f_{i,j}) = \frac{1}{lh}\sum_{k=1}^{l} K\left(\frac{f_{i,j} - f_{i,k}}{h}\right)(j, k = 1, 2, 3, \dots, l)$$

$$K(x) = \frac{1}{\sqrt{2\pi}} \exp\left(-\frac{1}{2}x^2\right)$$

$$x = \frac{f_{i,j} - f_{i,k}}{h}$$

where, K(x) is the selected kernel density function, l is a set data length of one time sequence, h is a set time interval value, i is an order, and $f_{i,j}$ is the $j_{th}$ data of a mode frequency vector $f_i$;

through the kernel density estimation vector PDF ($f_i$), obtaining a cumulative probability estimation vector CDF($f_i$) of the sample vector $f_i$ by calculation:

$$CDF(f_{i,j}) = \frac{1}{lh}\sum_{k=1}^{l} \int_{-\infty}^{f_{i,j}} K\left(\frac{a - f_{i,k}}{h}\right) da (j, k = 1, 2, 3, \dots, l)$$

finally, performing inverse transformation of the standard normal distribution function on the cumulative probability estimation vector CDF($f_i$), which is converted into a Q statistic:

$$Q_i = \Phi^{-1}(CDF(f_i))$$

where, $\Phi^{-1}(\cdot)$ is an inverse function of the standard normal distribution function, and converting non-normal data into the random variable which obeys the standard normal distribution is completed at this moment.

As a further preferred solution of the present disclosure, step 3.2 includes the following specific steps: according to the random variable which obeys the standard normal distribution, in combination with the Shewhart mean control chart, preliminarily setting the value of the significance level value $\alpha$, and obtaining the probability distribution function corresponding to the significance level value $\alpha$:

$$P\left(\left|\frac{f - \mu_0}{\frac{\sigma}{\sqrt{n}}}\right| < Z_{\alpha/2}\right) = 1 - \alpha$$

where, $\mu_0$ is a population mean, $\sigma$ is a sample population standard deviation, $\alpha$ is the significance level value, $Z_{\alpha/2}$ is an upper $\alpha/2$ fractile of the standard normal distribution, f is a parameter in the probability density function, and n is the total number of samples to be tested;

through the probability distribution function corresponding to the significance level value α, obtaining the established normal distribution probability model.

As a further preferred solution of the present disclosure, in step 4, the upper control threshold UCL is calculated in a manner of:

$$UCL = \mu_0 + Z_{\alpha/2} \frac{\sigma}{\sqrt{n}}$$

the lower control threshold LCL is calculated in a manner of:

$$LCL = \mu_0 - Z_{\alpha/2} \frac{\sigma}{\sqrt{n}}.$$

As a further preferred solution of the present disclosure, it is characterized in that, in step 3.2, the range of the preliminarily set value of the significance level value α is 0.05-0.15.

As a further preferred solution of the present disclosure, in step 6.1, $P_{LU}'=1\%$, Ts'=0.1 s, $M_s'=0.01$ Hz.

The present invention has the following beneficial effects:

1. The present disclosure discloses a dynamic identification method of bridge scour based on health monitoring data, by collecting the changes of the acceleration of a bridge foundation structure in a scour state with time, the changing vibration change frequency of the bridge foundation structure in the scour state is obtained, so as to achieve the identification and early warning of the changes of the bridge foundation structure, and finally the rapid detection and diagnosis of the deformation of the bridge foundation structure is achieved, which provides a theoretical basis for selective further underwater detection and rapid screening of regional bridge scour, and provides important support for early warning for the safety of bridge structures. Compared with a conventional scour detection technology, this method does not require underwater operations, nor does it need to directly observe the scour state, only on-site measurement and parameter tracking of the dynamic response of bridge superstructures is needed.

2. By proposing the influence of the temperature effect on the collected changing vibration change frequency of the bridge foundation structure in the scour state, the identification accuracy of the deformation degree of the bridge foundation structure is improved.

DETAILED DESCRIPTION

Figure 1:
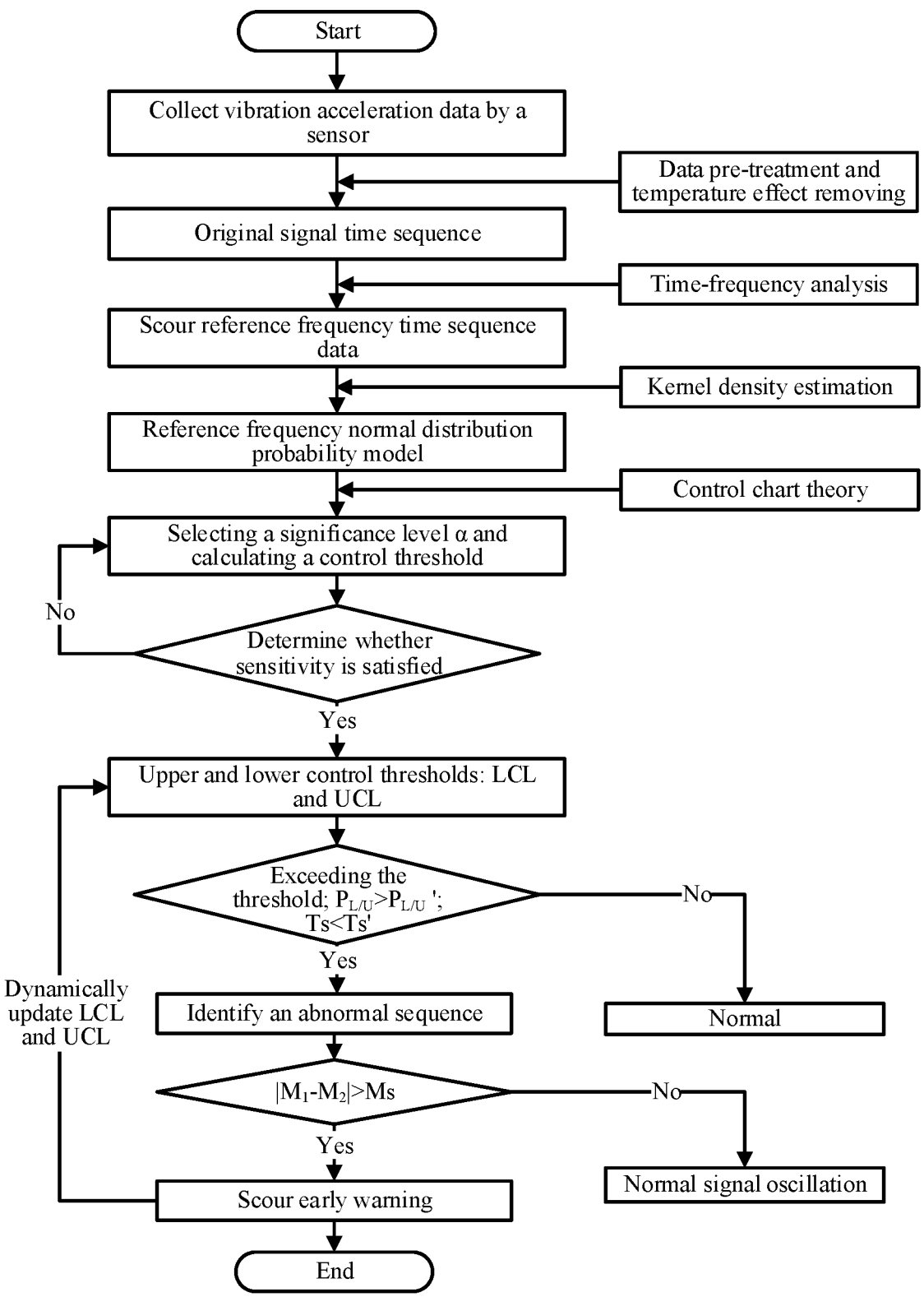
FIG. 1 is a flow chart for implementing scour early warning of dynamic identification method of bridge scour based on health monitoring data according to the present disclosure.
Figure 2:
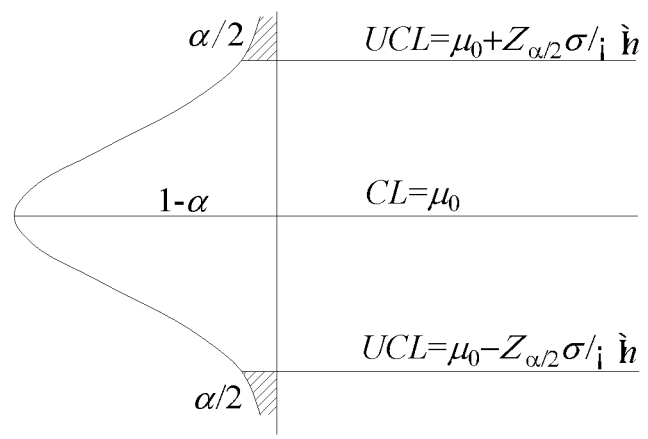
FIG. 2 is a schematic diagram for control limit setting of a Shewhart control chart used in the present disclosure when calculating an abnormal warning control threshold of a time-frequency characteristic change of a scour evaluation reference mode.
Figure 3A:
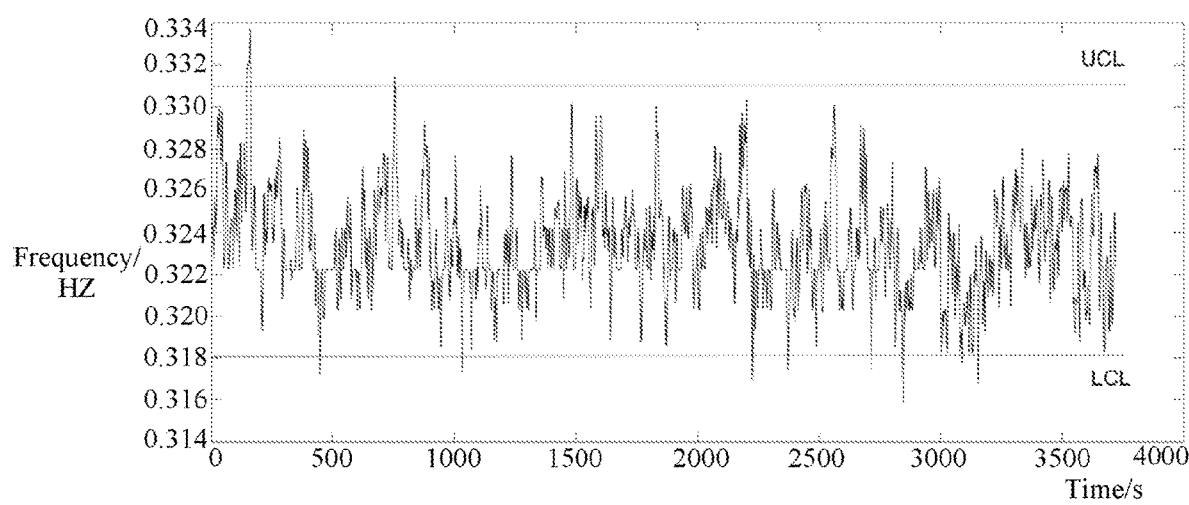
FIG. 3a is a diagram of scour early warning results according to measured data of a certain large-scale cable-stayed bridge when a significance level α is set as 0.05 according to the present disclosure.
Figure 3B:
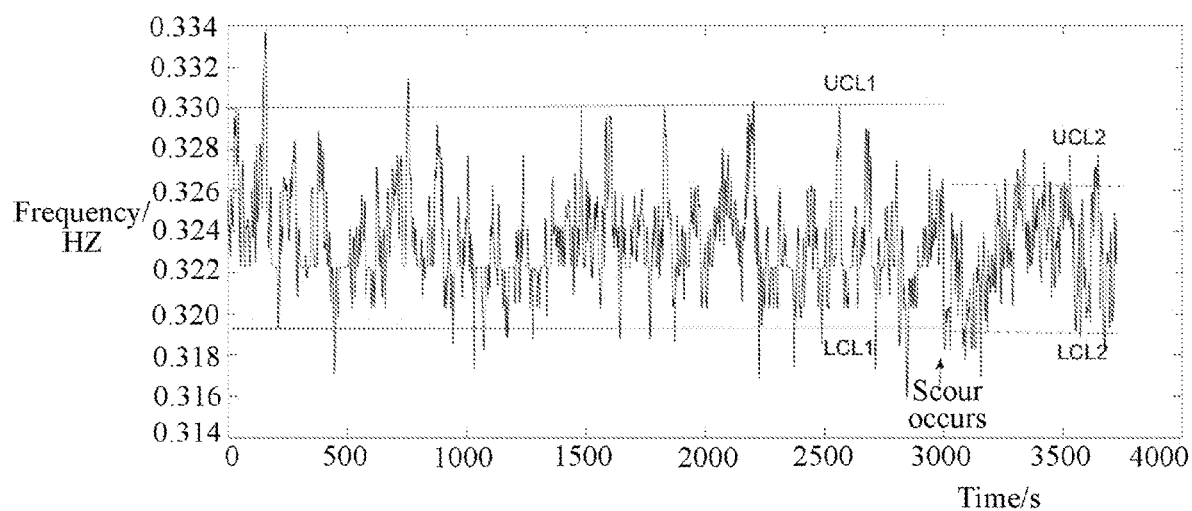
FIG. 3b is a diagram of scour early warning results according to measured data of a certain large-scale cable-stayed bridge when a significance level α is set as 0.10 according to the present disclosure.
Figure 3C:
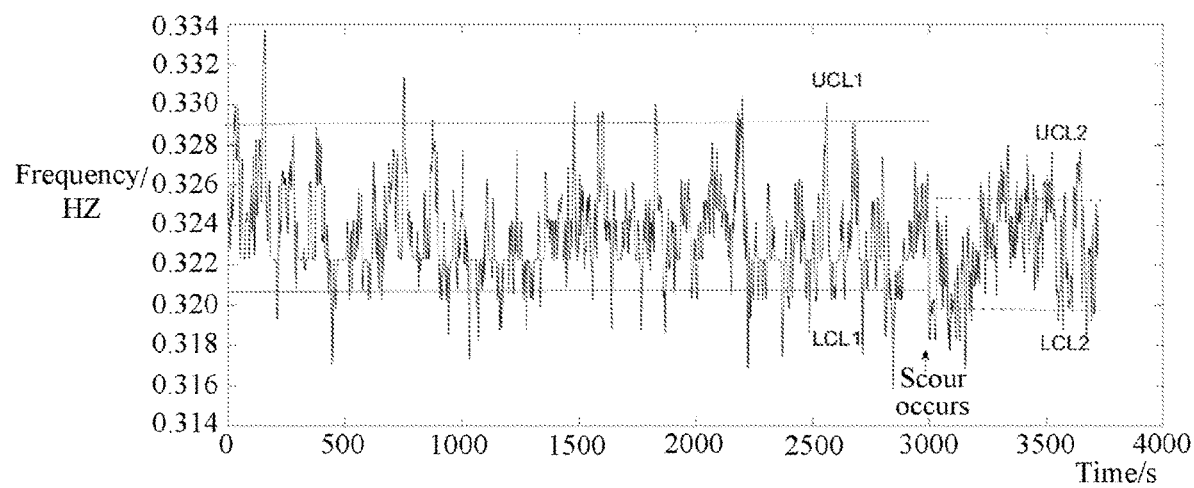
FIG. 3c is a diagram of scour early warning results according to measured data of a certain large-scale cable-stayed bridge when a significance level α is set as 0.15 according to the present disclosure.

The present invention is described in further detail below with reference to the accompanying drawings and specific exemplary implementations.

In the description of the present invention, it should be understood that orientations or position relationships indicated by terms such as "left side", "right side", "upper portion", "lower portion" are orientations or position relationships shown based on the accompanying drawings, and are merely used for describing the present invention and simplifying the description, rather than indicating or implying that the mentioned apparatus or element should have a particular orientation or be constructed and operated in a particular orientation or needs to be constructed and operated in a particular orientation. "First", "second", and the like do not indicate the importance of the components, and therefore cannot be construed as a limitation on the present invention. The specific dimensions used in the embodiments are only for illustrating the technical solutions, and do not limit the protection scope of the present invention.

A dynamic identification method of bridge scour based on health monitoring data includes the following specific steps:

Step 1: collecting an acceleration-time curve of a bridge foundation structure when vibrating: collecting the acceleration-time curve of each bridge foundation structure in a scour state by a health monitoring system when each bridge foundation structure vibrates, and performing anti-interference factor pre-treatment on the acceleration-time curve:

step 1.1: after obtaining the acceleration-time curve of each bridge foundation in the scour state by the health monitoring system when each bridge foundation structure vibrates, removing a high-order frequency signal in the acceleration-time curve by using a filter and a signal detrending function;

step 1.2: calculating and processing to obtain a missing signal length in a frequency-time curve:

firstly, defining an index structure missing:

$$\text{Missing} = \begin{bmatrix} s_1 & e_1 \\ s_2 & e_2 \\ \cdots & \cdots \\ s_m & s_m \\ \cdots & \cdots \\ s_k & e_k \end{bmatrix}$$

where, $s_m$, $e_m$ are respectively beginning and ending indexes of missing data in the m segment; k is the total number of segments with missing data; a missing signal length in the m segment is missing. longm=$e_m-s_m$;

when the missing signal length is less than a length tolerance threshold, the missing signal length is filled by an extension filling method; and when the missing signal length is greater than the length tolerance threshold, discarding the missing signal length;

step 1.3: identifying and removing outliers in the frequency-time curve, and supplementing the removed outliers by using a numerical interpolation method; and step 1.4: removing the temperature effect in the acceleration-time curve obtained by the processing in step 1.3, and obtaining a frequency-time curve of the bridge scour reference mode; measuring a bridge foundation structure frequency of the bridge foundation structure at a specific temperature by a temperature sensor in advance, decomposing the acceleration-time curve by an EMD algorithm to obtain a multi-order sub-mode acceleration-time curve, obtaining a main frequency by Fourier transform of the multi-order sub-mode acceleration-time curve, and eliminating the acceleration-time curve which is close to the bridge foundation structure frequency at the specific temperature, and obtaining an acceleration-time curve of the scour reference mode after reconstruction.

Step 2: obtaining a frequency-time curve of a bridge scour reference mode: by Fourier transform on the acceleration-time curve in step 1, obtaining the frequency-time curve of the scour reference mode.

Step 3: determining a value of a significance level value $\alpha$:

step 3.1: by using a kernel density estimation method, establishing a time-frequency probability distribution model of a bridge scour evaluation reference mode, and transforming a scour reference mode frequency into a random variable which obeys standard normal distribution;

taking a frequency signal to be identified as a one-dimensional continuous sample vector $f_i$, and obtaining a kernel density estimation vector PDF $(f_i)$ of the sample vector $f_i$ by using a selected kernel density function;

$$PDF(f_{i,j}) = \frac{1}{lh}\sum_{k=1}^{l} K\left(\frac{f_{i,j} - f_{i,k}}{h}\right)(j, k = 1, 2, 3, \ldots, l)$$

$$K(x) = \frac{1}{\sqrt{2\pi}} \exp\left(-\frac{1}{2}x^2\right)$$

$$x = \frac{f_{i,j} - f_{i,k}}{h}$$

where, $K(x)$ is the selected kernel density function, l is a set data length of one time sequence, h is a set time interval value, i is an order, and $f_{i,j}$ is the $j_{th}$ data of a mode frequency vector $f_i$;

through the kernel density estimation vector PDF $(f_i)$, obtaining a cumulative probability estimation vector CDF$(f_i)$ of the sample vector $f_i$ by calculation:

$$CDF(f_{i,j}) = \frac{1}{lh}\sum_{k=1}^{l} \int_{-\infty}^{f_{i,j}} K\left(\frac{a - f_{i,k}}{h}\right) da (j, k = 1, 2, 3, \ldots, l)$$

finally, performing inverse transformation of the standard normal distribution function on the cumulative probability estimation vector CDF$(f_i)$, which is converted into a Q statistic:

$$Q_i = \Phi^{-1}(CDF(f_i))$$

where, $\Phi^{-1}(\cdot)$ is an inverse function of the standard normal distribution function, and converting non-normal data into the random variable which obeys the standard normal distribution is completed at this moment.

step 3.2: according to the random variable which obeys the standard normal distribution, in combination with a Shewhart mean control chart, preliminarily setting the value of the significance level value $\alpha$, in this embodiment, the range of the preliminarily set value of the significance level value $\alpha$ being 0.05-0.15, and obtaining a probability distribution function corresponding to the significance level value $\alpha$, and establishing a normal distribution probability model;

according to the random variable which obeys the standard normal distribution, in combination with the Shewhart mean control chart, preliminarily setting the value of the significance level value $\alpha$, and obtaining the probability distribution function corresponding to the significance level value $\alpha$:

$$P\left(\left|\frac{f - \mu_0}{\frac{\sigma}{\sqrt{n}}}\right| < Z_{\alpha/2}\right) = 1 - \alpha$$

where, $\mu_0$ is a population mean, $\sigma$ is a sample population standard deviation, $\alpha$ is the significance level value, $Z_{\alpha/2}$ is an upper $\alpha/2$ fractile of the standard normal distribution, f is a parameter in the probability density function, and n is the total number of samples to be tested;

through the probability distribution function corresponding to the significance level value $\alpha$, obtaining the established normal distribution probability model.

step 3.3: performing identification sensitivity calibration according to the range of the preliminarily set value of the significance level value $\alpha$.

Step 4: bringing $\alpha'$ into the normal distribution probability model, and obtaining an upper control threshold UCL and a lower control threshold LCL of the abnormal warning of a time-frequency change of a first-time scour bridge evaluation reference mode by calculation:

$$UCL = \mu_0 + Z_{\alpha/2}\frac{\sigma}{\sqrt{n}},$$

$$LCL = \mu_0 - Z_{\alpha/2}\frac{\sigma}{\sqrt{n}}.$$

Step 5: identifying an abnormal segment in frequency segments of a scoured bridge to be identified:

step 5.1: determining the frequency segment of the scoured bridge to be identified which exceeds the upper control threshold UCL or the lower control threshold LCL as a time-frequency abnormal segment.

Step 6: identifying an abnormal time-frequency sequence in the time-frequency abnormal segment:

step 6.1: the time-frequency abnormal segment including a plurality of time-frequency sequences, identifying time-frequency abnormal sequences in the plurality of time-frequency sequences:

setting identification parameters of the time-frequency abnormal sequence, the identification parameters of the time-frequency abnormal sequence including a time-duration ratio parameter $P_{L/U}'$ of an abnormal reference frequency sequence, a time interval parameter Ts' between two adjacent abnormal frequencies, and a change difference parameter $M_3'$ of a mean value of scour reference frequencies; in this embodiment, $P_{L/U}'=1\%$, Ts'=0.1 s, M'=0.01 Hz;

step 6.2: calculating the time-duration ratio parameter $P_{L/U}$ of the abnormal frequency sequence of the abnormal segment:

$$P_{L/U} = T_{ab}/T_{t0}$$

where, $T_{ab}$ is the time duration of the frequency sequence exceeding the upper control threshold UCL or the lower control threshold LCL, and $T_{t0}$ is the total time duration of the abnormal segment;

calculating Ts of the abnormal segment, Ts being a time interval between two adjacent Tabs;

when $P_{L/U} > P_{L/U}'$, and Ts<Ts', it is determined that the time-frequency sequence is the abnormal sequence, and step 6.3 is started, otherwise, it is determined that the time-frequency sequence is normal;

step 6.3: calculating a scour reference frequency time sequence mean value change difference $M_s$ in the time-frequency abnormal sequence:

$$M_s' |M_1 - M_2|$$

where $M_1$ is a frequency mean value of the time-frequency abnormal sequence, and $M_2$ is a frequency mean value of the normal segment in a healthy state of the previous of abnormal segment with the same time interval;

When $M_s \leq M_s'$, it is determined that the abnormal sequence is in normal signal oscillation; when $M_s > M_s'$, scour early warning is performed for the abnormal sequence.

Step 7: after completing the scour early warning of the abnormal sequence, repeating steps 5-6 to update the upper control threshold and the lower control threshold of random fluctuation of time-frequency characteristics of the bridge scour reference mode so as to prepare for the next anomaly identification and scour early warning.

The above method steps and basic formula principles may also be loaded onto a computer or other programmable data processing apparatuses to perform a series of operational steps on the computer or other programmable apparatuses to achieve computer processing such that instructions executed on the computer or other programmable apparatuses are used for implementing the functions or steps specified in one or more flows of the flow chart.

Although preferred implementations of the present invention have been described in detail above with reference to the accompanying drawings, the present invention is not limited to specific details in the foregoing implementations. Various equivalent variations can be made to the technical solutions of the present invention within the scope of the technical idea of the present invention, and such equivalent variations all fall within the protection scope of the present invention.

What is claimed is:

1. A dynamic identification method of bridge scour based on health monitoring data performed by a computer having a processor and a non-transitory computer readable storage medium storing a computer-executable program, wherein when the computer-executable program is executed by the processor, the program causes the processor to perform the method comprising the following steps:

step 1: receiving the health monitoring data containing an acceleration-time curve of a bridge foundation structure in a scour state from a health monitoring system, the acceleration-time curve being collected by the health monitoring system when the bridge foundation structure vibrates, and performing anti-interference factor pre-treatment on the acceleration-time curve;

step 2: by Fourier transform on the acceleration-time curve in step 1, obtaining a frequency-time curve of a bridge scour reference mode;

step 3: determining a value of a significance level value α, wherein step 3 comprises the following steps:

step 3.1: by using a kernel density estimation method, establishing a time-frequency probability distribution model of a bridge scour evaluation reference mode, and transforming a scour reference mode frequency into a random variable which obeys standard normal distribution;

step 3.2: according to the random variable which obeys the standard normal distribution, in combination with a Shewhart mean control chart, preliminarily setting the value of the significance level value α, and obtaining a probability distribution function corresponding to the significance level value α, and establishing a normal distribution probability model; and step 3.3: performing identification sensitivity calibration according to the range of the preliminarily set value of the significance level value α;

step 4: bringing the significance level value α into the normal distribution probability model, and obtaining an upper control threshold UCL and a lower control threshold LCL of the abnormal warning of a time-frequency change of a first-time scour bridge evaluation reference mode by calculation;

step 5: identifying an abnormal segment in frequency segments of a scoured bridge to be identified:

step 6: identifying an abnormal time-frequency sequence in the time-frequency abnormal segment, wherein step 6 comprises the following steps:

step 6.1: the time-frequency abnormal segment comprising a plurality of time-frequency sequences, identifying time-frequency abnormal sequences in the plurality of time-frequency sequences:

setting identification parameters of the time-frequency abnormal sequence, the identification parameters of the time-frequency abnormal sequence comprising a time-duration ratio parameter $P_{L/U}'$ of an abnormal reference frequency sequence, a time interval parameter Ts' between two adjacent abnormal frequencies, and a change difference parameter $M_s'$ of a mean value of scour reference frequencies;

step 6.2: calculating the time-duration ratio parameter $P_{L/U}$ of the abnormal frequency sequence of the abnormal segment:

$$P_{L/U} = T_{ab}/T_{t0}$$

wherein, $T_{ab}$ is the time duration of the frequency sequence exceeding the upper control threshold UCL or the lower control threshold LCL, and $T_{t0}$ is the total time duration of the abnormal segment;

calculating Ts of the abnormal segment, Ts being a time interval between two adjacent Tabs;

when $P_{L/U} > P_{L/U}'$, and Ts<Ts', it is determined that the time-frequency sequence is the abnormal sequence, and step 6.3 is started, otherwise, it is determined that the time-frequency sequence is normal;

step 6.3: calculating a scour reference frequency time sequence mean value change difference $M_s$ in the time-frequency abnormal sequence:

$$M_s' |M_1 - M_2|$$

wherein $M_1$ is a frequency mean value of the time-frequency abnormal sequence, and $M_2$ is a frequency mean value of the normal segment in a healthy state of the previous of abnormal segment with the same time interval;

when $M_s \leq M_s'$, it is determined that the abnormal sequence is in normal signal oscillation; when $M_s > M_s'$, scour early warning is performed for the abnormal sequence; and step 7: after completing the scour early warning of the abnormal sequence, repeating steps 5-6 and updating the upper control threshold and the lower control threshold of random fluctuation of time-frequency characteristics of the bridge scour reference mode so as to prepare for the next anomaly identification and scour early warning.

2. The dynamic identification method of bridge scour based on health monitoring data according to claim 1, wherein step 1 specifically comprises the following steps:

step 1.1: after obtaining the acceleration-time curve of each bridge foundation in the scour state by the health monitoring system when each bridge foundation structure vibrates, removing a high-order frequency signal in the acceleration-time curve by using a filter and a signal detrending function;

step 1.2: calculating and processing to obtain a missing signal length in a frequency-time curve:

firstly, defining an index structure missing:

$$\text{Missing} = \begin{bmatrix} s_1 & e_1 \\ s_2 & e_2 \\ \cdots & \cdots \\ s_m & s_m \\ \cdots & \cdots \\ s_k & e_k \end{bmatrix}$$

wherein, $S_m$, $e_m$ are respectively beginning and ending indexes of missing data in the m segment; k is the total number of segments with missing data; a missing signal length in the m segment is missing, $\text{longm} = e_m - S_m$;

when the missing signal length is less than a length tolerance threshold, the missing signal length is filled by an extension filling method; and when the missing signal length is greater than the length tolerance threshold, discarding the missing signal length;

step 1.3: identifying and removing outliers in the frequency-time curve, and supplementing the removed outliers by using a numerical interpolation method; and step 1.4: removing the temperature effect in the acceleration-time curve obtained by the processing in step 1.3, and obtaining a frequency-time curve of the bridge scour reference mode; measuring a bridge foundation structure frequency of the bridge foundation structure at a specific temperature by a temperature sensor in advance, decomposing the acceleration-time curve by an EMD algorithm to obtain a multi-order sub-mode acceleration-time curve, obtaining a main frequency by Fourier transform of the multi-order sub-mode acceleration-time curve, and eliminating the acceleration-time curve which is close to the bridge foundation structure frequency at the specific temperature, and obtaining an acceleration-time curve of the scour reference mode after reconstruction.

3. The dynamic identification method of bridge scour based on health monitoring data according to claim 1, wherein step 3.1 comprises the following specific steps:

taking a frequency signal to be identified as a one-dimensional continuous sample vector $f_i$, and obtaining a kernel density estimation vector PDF ($f_i$) of the sample vector $f_i$ by using a selected kernel density function;

$$PDF(f_{i,j}) = \frac{1}{1h}\sum_{k=1}^{1} K\left(\frac{f_{i,j} - f_{i,k}}{h}\right)(j, k = 1, 2, 3, \ldots, 1)$$

$$K(x) = \frac{1}{\sqrt{2\pi}} \exp\left(-\frac{1}{2}x^2\right)$$

$$x = \frac{f_{i,j} - f_{i,k}}{h}$$

wherein, K(x) is the selected kernel density function, 1 is a set data length of one time sequence, h is a set time interval value, i is an order, and $f_{i,j}$ is the $j_{th}$ data of a mode frequency vector $f_i$;

through the kernel density estimation vector PDF ($f_i$), obtaining a cumulative probability estimation vector CDF($f_i$) of the sample vector $f_i$ by calculation:

$$CDF(f_{i,j}) = \frac{1}{lh}\sum_{k=1}^{l}\int_{-\infty}^{f_{i,j}} K\left(\frac{a - f_{i,k}}{h}\right)da(j, k = 1, 2, 3, \ldots, l)$$

finally, performing inverse transformation of the standard normal distribution function on the cumulative probability estimation vector CDF($f_i$), which is converted into a Q statistic:

$$Q_i = \Phi^{-1}(CDF(f_i))$$

wherein, $\Phi^{-1}(\cdot)$ is an inverse function of the standard normal distribution function, and converting non-normal data into the random variable which obeys the standard normal distribution is completed at this moment.

4. The dynamic identification method of bridge scour based on health monitoring data according to claim 3, wherein step 3.2 comprises the following specific steps:

according to the random variable which obeys the standard normal distribution, in combination with the Shewhart mean control chart, preliminarily setting the value of the significance level value $\alpha$, and obtaining the probability distribution function corresponding to the significance level value $\alpha$:

$$P\left(\left|\frac{f - \mu_0}{\frac{\sigma}{\sqrt{n}}}\right| < Z_{\alpha/2}\right) = 1 - \alpha$$

wherein, $\mu_0$ is a population mean, $\sigma$ is a sample population standard deviation, $\alpha$ is the significance level value, $Z_{\alpha/2}$ is an upper $\alpha/2$ fractile of the standard normal distribution, f is a parameter in the probability density function, and n is the total number of samples to be tested;

through the probability distribution function corresponding to the significance level value $\alpha$, obtaining the established normal distribution probability model.

5. The dynamic identification method of bridge scour based on health monitoring data according to claim 4, wherein in step 4, the upper control threshold UCL is calculated in a manner of:

$$UCL = \mu_0 + Z_{\alpha/2}\frac{\sigma}{\sqrt{n}}$$

the lower control threshold LCL is calculated in a manner of:

$$LCL = \mu_0 - Z_{\alpha/2}\frac{\sigma}{\sqrt{n}}.$$

6. The dynamic identification method of bridge scour based on health monitoring data according to claim 1, wherein in step 3.2, the range of the preliminarily set value of the significance level value $\alpha$ is 0.05-0.15.

7. The dynamic identification method of bridge scour based on health monitoring data according to claim 1, wherein in step 6.1, $P_{L/U}'=1\%$, $T_s'=0.1$ s, $M_s'=0.01$ Hz.

* * * * *